(12) United States Patent
Davis et al.

(10) Patent No.: US 8,752,118 B1
(45) Date of Patent: Jun. 10, 2014

(54) AUDIO AND VIDEO CONTENT-BASED METHODS

(75) Inventors: Bruce L. Davis, Lake Oswego, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 1435 days.

(21) Appl. No.: 09/562,517

(22) Filed: May 1, 2000

Related U.S. Application Data

(60) Provisional application No. 60/134,782, filed on May 19, 1999, provisional application No. 60/141,763, filed on Jun. 30, 1999, provisional application No. 60/141,538, filed on Jun. 28, 1999.

(51) Int. Cl.
*H04N 7/16* (2011.01)

(52) U.S. Cl.
USPC .................... 725/134; 725/136; 725/142

(58) Field of Classification Search
USPC .......... 725/110, 112, 35, 136, 142, 134, 109; 380/28–52; 382/100, 232
See application file for complete search history.

(56) References Cited

U.S. PATENT DOCUMENTS

| | | | |
|---|---|---|---|
| 3,882,400 A * | 5/1975 | Hamada | 455/158.3 |
| 4,237,486 A * | 12/1980 | Shimp | 348/475 |
| 4,727,504 A * | 2/1988 | Van Broekhoven | 708/300 |
| 5,119,507 A | 6/1992 | Mankovitz | |
| 5,189,630 A | 2/1993 | Barstow et al. | |
| 5,210,820 A | 5/1993 | Kenyon | |
| 5,493,582 A * | 2/1996 | Flynn et al. | 375/219 |
| 5,577,266 A | 11/1996 | Takahisa et al. | |
| 5,636,292 A * | 6/1997 | Rhoads | 382/232 |
| 5,652,615 A * | 7/1997 | Bryant et al. | 725/35 |
| 5,673,316 A | 9/1997 | Auerbach et al. | |
| 5,703,795 A | 12/1997 | Mankovitz | |
| 5,742,845 A | 4/1998 | Wagner | |
| 5,761,606 A | 6/1998 | Wolzien | |
| 5,761,686 A | 6/1998 | Bloomberg | |
| 5,764,910 A * | 6/1998 | Shachar | 709/223 |
| 5,765,176 A | 6/1998 | Bloomberg | |
| 5,774,666 A | 6/1998 | Portuesi | |
| 5,778,102 A | 7/1998 | Sandford, II et al. | |
| 5,822,432 A * | 10/1998 | Moskowitz et al. | 380/28 |
| 5,832,223 A * | 11/1998 | Hara et al. | 725/114 |
| 5,838,458 A | 11/1998 | Tsai | |
| 5,841,978 A * | 11/1998 | Rhoads | 709/217 |
| 5,892,900 A | 4/1999 | Ginter et al. | |
| 5,900,608 A | 5/1999 | Iida | |
| 5,905,248 A | 5/1999 | Russell et al. | |
| 5,905,800 A | 5/1999 | Moskowitz et al. | |
| 5,913,210 A * | 6/1999 | Call | 707/4 |
| 5,915,027 A | 6/1999 | Cox et al. | |
| 5,938,727 A | 8/1999 | Ikeda | |
| 5,939,695 A | 8/1999 | Nelson | |
| 5,943,422 A * | 8/1999 | Van Wie et al. | 705/54 |
| 5,946,646 A * | 8/1999 | Schena et al. | 702/177 |
| 5,950,173 A | 9/1999 | Perkowski | |

(Continued)

FOREIGN PATENT DOCUMENTS

WO WO9636163 11/1996

*Primary Examiner* — Hunter B Lonsberry

(57) ABSTRACT

Wireless and internet broadcasts can carry in-band digital information though use of watermark technology. This digital information can be used to direct a user to a particular internet site or resident application for supplemental or complimentary information, entertainment, merchandising, and commerce opportunities.

20 Claims, 1 Drawing Sheet

(56) References Cited

U.S. PATENT DOCUMENTS

| | | | |
|---|---|---|---|
| 5,963,916 A | 10/1999 | Kaplan | |
| 5,971,277 A | 10/1999 | Cragun et al. | |
| 5,979,757 A | 11/1999 | Tracy et al. | |
| 5,991,737 A | 11/1999 | Chen | |
| 6,012,102 A | 1/2000 | Shachar | |
| 6,018,768 A * | 1/2000 | Ullman et al. | 709/218 |
| 6,032,195 A | 2/2000 | Reber et al. | |
| 6,052,486 A | 4/2000 | Knowlton et al. | |
| 6,061,719 A | 5/2000 | Bendinelli et al. | |
| 6,081,629 A | 6/2000 | Browning | |
| 6,084,528 A | 7/2000 | Beach et al. | |
| 6,088,455 A * | 7/2000 | Logan et al. | 380/200 |
| 6,098,106 A | 8/2000 | Philyaw et al. | |
| 6,108,656 A | 8/2000 | Durst et al. | |
| 6,119,944 A | 9/2000 | Mulla et al. | |
| 6,121,530 A | 9/2000 | Sonoda | |
| 6,122,403 A | 9/2000 | Rhoads | |
| 6,125,172 A | 9/2000 | August et al. | |
| 6,148,331 A | 11/2000 | Parry | |
| 6,154,738 A | 11/2000 | Call | |
| 6,164,534 A | 12/2000 | Rathus et al. | |
| 6,199,048 B1 | 3/2001 | Hudetz et al. | |
| 6,226,387 B1 * | 5/2001 | Tewfik et al. | 382/100 |
| 6,240,459 B1 | 5/2001 | Roberts | |
| 6,243,480 B1 | 6/2001 | Zhao et al. | |
| 6,249,226 B1 | 6/2001 | Harrison et al. | |
| 6,311,214 B1 | 10/2001 | Rhoads | |
| 6,314,569 B1 | 11/2001 | Chernock et al. | |
| 6,345,256 B1 | 2/2002 | Milsted et al. | |
| 6,389,055 B1 | 5/2002 | August et al. | |
| 6,411,994 B2 * | 6/2002 | van Allen et al. | 709/219 |
| 6,418,424 B1 | 7/2002 | Hoffberg et al. | |
| 6,448,979 B1 | 9/2002 | Schena et al. | |
| 6,457,177 B1 | 9/2002 | Reams | |
| 6,470,378 B1 * | 10/2002 | Tracton et al. | 709/203 |
| 6,484,198 B1 | 11/2002 | Milovanovic et al. | |
| 6,513,139 B2 * | 1/2003 | Gray | 714/771 |
| 6,526,449 B1 | 2/2003 | Philyaw et al. | |
| 6,611,830 B2 * | 8/2003 | Shinoda et al. | 707/3 |
| 6,636,896 B1 | 10/2003 | Philyaw | |
| 6,647,417 B1 | 11/2003 | Hunter et al. | |
| 6,650,761 B1 | 11/2003 | Rodriguez et al. | |
| 6,674,993 B1 | 1/2004 | Tarbouriech | |
| 6,687,383 B1 | 2/2004 | Kanevsky et al. | |
| 6,731,612 B1 * | 5/2004 | Koss | 370/310 |
| 6,754,822 B1 * | 6/2004 | Zhao | 713/176 |
| 6,754,905 B2 | 6/2004 | Gordon et al. | |
| 6,807,676 B1 | 10/2004 | Robbins | |
| 6,931,451 B1 | 8/2005 | Logan et al. | |
| 6,968,564 B1 | 11/2005 | Srinivasan | |
| 6,973,669 B2 | 12/2005 | Daniels | |
| 7,251,475 B2 | 7/2007 | Kawamoto | |
| 2001/0001854 A1 | 5/2001 | Schena et al. | |
| 2001/0011233 A1 | 8/2001 | Narayanaswami | |
| 2001/0055391 A1 | 12/2001 | Jacobs | |
| 2003/0051252 A1 | 3/2003 | Miyaoku et al. | |
| 2008/0134255 A1 | 6/2008 | Ferris | |

* cited by examiner

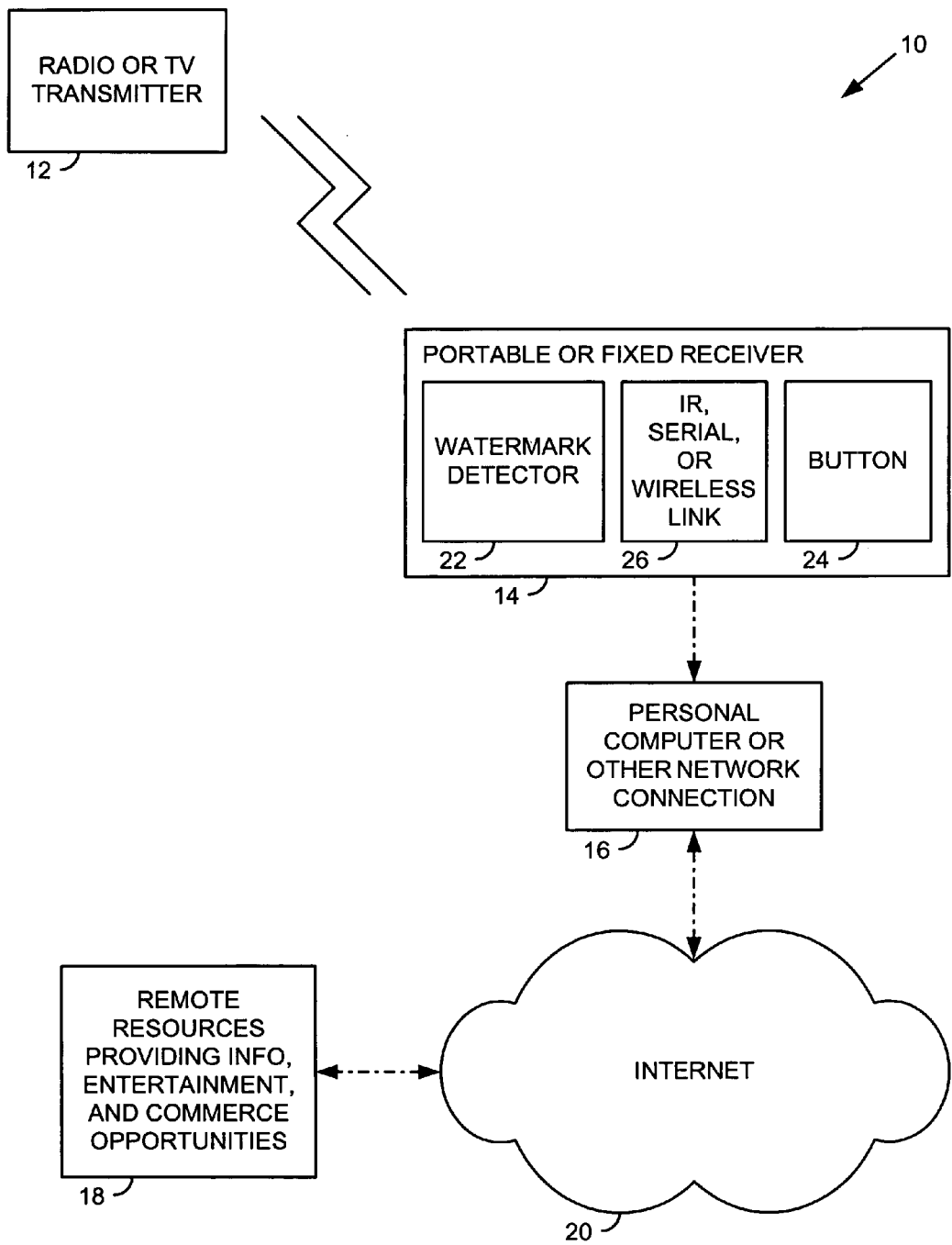

AUDIO AND VIDEO CONTENT-BASED METHODS

RELATED APPLICATION DATA

This application claims priority to provisional applications 60/134,782, filed May 19, 1999; 60/141,763, filed Jun. 30, 1999; and 60/141,538, filed Jun. 28, 1999.

The subject matter of the present application is related to that disclosed in U.S. Pat. No. 5,862,260, and in application Ser. No. 08/746,613, filed Nov. 12, 1996 (now U.S. Pat. No. 6,122,403); Ser. No. 09/343,104, filed Jun. 29, 1999 (now abandoned in favor of continuation application Ser. No. 10/764,430, filed Jan. 23, 2004); 60/164,619, filed Nov. 10, 1999; Ser. No. 09/503,881, filed Feb. 14, 2000 (now U.S. Pat. No. 6,614,914); Ser. No. 09/525,865, filed Mar. 15, 2000 (now U.S. Pat. No. 6,611,607); and Ser. No. 09/547,664, filed Apr. 12, 2000.

BACKGROUND AND SUMMARY OF THE INVENTION

Broadcast signals can carry in-band digital information though use of known watermark technology (a few examples of which are detailed in the cited patents and applications). This digital information can be used to direct a user to a particular internet site or resident application for supplemental or complimentary information, entertainment, merchandising, and commerce opportunities.

BRIEF DESCRIPTION OF THE DRAWINGS

FIG. 1 shows an illustrative embodiment of the present invention.

DETAILED DESCRIPTION

Referring to FIG. 1, an illustrative embodiment 10 of the present invention includes a radio or television transmitter 12, a portable or fixed radio or television receiver 14, a personal computer or other network connection 16, and remote resources 18 available through the internet 20. The transmitter 12 is conventional, but includes a watermark encoder to embed a digital watermark in the transmitted signal. The receiver 14 is likewise generally conventional (e.g., including an RF amplifier, a mixer, one or more intermediate frequency amplifiers, and a detector), but additionally includes a watermark detector 22, a button or other user interface feature 24 (which may be on a remote control associated with the receiver), and an external interface 26 (e.g., infrared, wireless, Bluetooth, serial, USB, firewire, etc.). In some embodiments, the receiver can be a species of computer.

The watermark encoding and decoding can follow the techniques set forth in the cited patents and applications. In such arrangements, the watermark payload data is combined with a pseudo-random carrier signal (e.g., by multiplying, XOR-ing, etc.), and combined with (e.g. added to) the audio or video content signal. The carrier signal may be shaped in various ways. For example, zeroes in the carrier signal can be omitted (e.g., leaving values of −1 and 1, or −2, −1, 1, and 2, etc.), or the frequency spectrum of the carrier can be tailored to match the frequency spectrum of the signal being encoded, etc. In some embodiments, the watermarking also encodes a calibration signal with the payload data. This calibration signal is used in decoding, as detailed in the cited patents and applications (e.g., to permit accurate detection of the payload data even from a corrupted signal).

The computer 16 can be a personal computer, an internet appliance, or other network interface device. The computer includes provision for communicating with the external link of the receiver 14, and also includes a network connection for coupling to the internet 20. The remote resources 18 include the myriad servers coupled to the internet to provide information, entertainment, and commerce opportunities to users thereof.

In the illustrated system, audio material (such as a song or an advertisement) is transmitted to the receiver in the usual manner. Encoded in the audio signal is digital information represented as a watermark. Upon decoding at the receiver, this information is transmitted to the computer 16 (or stored for later transmission if the receiver does not have a persistent network connection).

The encoded information need only comprise a unique identifier, or database key. When passed to the computer 16 (and optionally therefrom to a remote resource 18), the identifier serves to initiate from such device one or more supplemental or complimentary applications corresponding to the encoded broadcast content, such as purchasing a song for download, purchasing a CD containing the song, viewing news and concert schedules for recording artists, viewing a music video, etc.

Similar arrangements and benefits can be delivered through watermarked spoken word programming, and through television (video) broadcasts. The broadcasts can be distributed through any of the conventional methods other than over-the-air, including cable and satellite.

The infrastructure through which the receiver 16 couples to the remote resources 18 can take various forms. In application Ser. No. 09/547,664, filed Apr. 12, 2000, the assignee detailed one such arrangement. In that system, the user device (e.g., receiver 14 or computer 16) dispatches the watermark ID to a router computer. That computer includes a database that stores a URL corresponding to each watermark ID. Upon receiving a watermark ID, the router computer returns the corresponding URL to the originating device (12 or 16). A browser at the originating device then establishes a link to the specified URL. That URL then provides the information, entertainment, or commerce opportunity corresponding to the encoded broadcast.

The just-detailed system is advantageous in that it permits the encoding of a short identifier in the broadcast (e.g., instead of a lengthy URL). Moreover, the corresponding URL can be changed over time, as needed. Other embodiments of the present invention, however, do not need this level of complexity; the encoded identifier can more directly trigger the desired remote resource response.

Turning to particular cases, consider a product advertisement encoded with watermark data that links to product specifications, multi-media product demonstrations, and/or purchase instructions. Alternatively, for commonplace items, the user might merely push a "buy" button 24 on the receiver and the order could be placed automatically (e.g., using one-click technology of the type detailed in Amazon's U.S. Pat. No. 5,960,411), or an order form could be invoked on the screen of the computer 16 as soon as the data was transmitted to it.

If a particular song was playing, the digital watermark transmitted with the song could cause a picture of the singer to appear on the personal computer. Alternatively, through an automatic link to the internet, users could indicate their like or dislike for the song. In still other applications the link can be used to allow the user to indicate a "vote" concerning a subject being played over the audio link. (In such embodiments, the embedded ID identifies the subject matter being voted on, and likewise serves to specify the remote resource 18 that is to receive the vote. To that resource the user's computer can dispatch a "yes" or "no" vote, a "like" or "dislike" preference, etc., by corresponding data sent over the internet.

As will be recognized, embodiments like that detailed can be used to enable interactive advertisement and promotion for local radio and TV broadcasters, generating traffic and fulfillment activities for local merchants. In one such embodiment, network broadcast content is locally customized with links corresponding to local merchants and other resources. Thus, a Ford advertisement may be customized to initiate a link to a local Ford dealership.

(Such local customization can be performed by the broadcaster or by another party. In some embodiments, nationally-distributed broadcast content can include links suitable for a national audience (e.g., to corporate web sites of advertisers). The local broadcaster may process such network feeds to identify such national links. When same are encountered, the local broadcast processor may look-up a corresponding local link. The existing national link data can then be replaced with the local link data. Or, the broadcast may have been encoded with "blank" watermark payload bits that can be filled-in by the local broadcaster without removing the national link. These supplemental payload bits can serve to indicate the locality in which the payload was received, permitting a router computer or the like to return a URL appropriate to that area.)

By employing such watermark-based content augmentation, satellite content distribution can enjoy a virtual high speed asynchronous network capability by downstreaming relatively small digital watermark payloads as segues to PCs and other devices with higher bandwidth connections. Rather than sending large payloads via the satellite link, the distributor sends "pointers" that direct receivers and recipients to certain applications on the other networks; essentially, off-loading the heavy lifting to other carriers so as to provide more value to its customers and content providers with very little bandwidth consumption. Auxiliary content that is not desired by all satellite subscribers is not sent over the satellite; those subscribers employ the satellite-conveyed watermark data to obtain such auxiliary content using other connections (e.g., terrestrial internet).

Radio over the internet is increasingly popular. However, the screen of the internet terminal is poorly utilized in such radio broadcasts. In accordance with another aspect of the invention, a watermark decoded from a web broadcast is decoded, and is used to enhance the experience by supplementing the audio with accompanying visual presentations.

In one such embodiment, the display presents streaming and other media on the screen while the internet radio is playing, such ancillary content being related to the then-broadcast radio content. This ancillary visual information can include concert schedules, fan news about the musician or person being broadcast, commercial web sites offering CDs, etc. During radio advertisements the display can present associated commercial information, with accompanying visual and/or video promotional materials. In addition to eye-catching visual presentations, these displays can include the opportunity to buy the advertised product, or download a "trial" version. (The visual displays can include conventional user interface features, such as buttons that can be selected by a user to initiate a purchase transaction or other operation in known manners.)

Technically, the computer radio decodes embedded watermark data from the audio programming. In some embodiments, the watermark literally conveys the address of one or more web sites that are to be displayed. The computer can be programmed to recognize these embedded web addresses, and display the corresponding web content in one or more separate browser windows. These windows can be tiled or otherwise presented on the display screen, together with the radio user interface. (The ancillary windows may overlie the radio interface in some embodiments.) As the radio content changes, the embedded watermark information also changes. Web displays corresponding to the earlier-decoded watermark are discontinued, and new web displays corresponding to the current watermark information are presented.

As noted, the audio broadcast need not be literally encoded with web addresses. Instead, the audio can be encoded with data including an identifier (e.g., 32 bits). On detecting this identifier, the computer connects to a remote web server (whose address is pre-identified) and provides this identifier. The remote server responds with the web addresses of the content to be displayed. The local computer then loads and displays these web pages, as in the first embodiment. As the audio programming changes, the embedded identifier also changes, leading to changed web addresses corresponding to the current audio material.

Returning to the original example of a watermark-aware radio, consider a car radio that has a "capture" button on the front panel (or other form of user interface, e.g., a Capture icon on a GUI). If a user hears a song they want to record and keep, they press the Capture button while the song is playing. In response, the radio device decodes a watermark embedded in the music, and thereby knows the identity of the music. The radio then makes a wireless transmission identifying the user and the desired song. A local repeater network picks up the wireless signal and relays it (e.g. by wireless rebroadcast, by modem, or other communication medium) to a music clearinghouse. The clearinghouse charges the user a nominal fee (e.g. via a pre-arranged credit card), and queues the music for download to a predetermined location associated with the user.

In one embodiment, the predetermined location is the user's own computer. If a "live" IP address is known for the user's computer, the music can be transferred immediately. If the user's computer is only occasionally connected to the internet, the music can be stored at a web site (e.g. protected with a user-set password), and can be downloaded to the user's computer whenever it is convenient.

In other embodiments, the predetermined location is a personal music library maintained by the user. The library can take the form, e.g., of a hard-disk or semiconductor memory array in which the user customarily stores music. This storage device is adapted to provide music data to one or more playback units employed by the user (e.g. a personal MP3 player, a home stereo system, a car stereo system, etc.). In most installations, the library is physically located at the user's residence, but could be remotely sited, e.g. consolidated with the music libraries of many other users at a central location.

The personal music library can have its own interne connection. Or it can be equipped with wireless capabilities, permitting it to receive digital music from wireless broadcasts (e.g. from the clearinghouse). In either case, the library can provide music to the user's playback devices by short-range wireless broadcast.

By such arrangement, a user can conveniently compile an archive of favorite music—even while away from home.

Many variants of the foregoing are of course possible. The radio can be a portable unit (e.g. a boombox, a Walkman radio, etc.) or a home device, rather than an automotive unit. The UI feature employed by the user to initiate capture a musical selection need not be a button (physical or on-screen). For example, in some embodiments it can be a voice-recognition system that responds to spoken commands, such as "capture" or "record." Or it can be a form of gesture interface.

Instead of decoding the watermark only in response to the user's "capture" command, the radio can decode watermarks from all received programs, and keep the most recent in a small FIFO memory. By such arrangement, the user need not issue the capture instruction while the song is playing, but can do so even after the song is finished.

In some embodiments, data corresponding to the watermark can be made available to the user in various forms. For example, it can be presented to the user on an LCD screen, identifying the artist and song currently playing. If a corresponding UI button is activated, the device can so-identify the last several selections. Moreover, the data need not be presented to the user in displayed form; it can be annunciated by known computer-speech technologies instead.

In embodiments in which the watermark does not convey ASCII text data, but instead conveys UIDs (unique identifiers), or coded abbreviations, the device must generally interpret this data before presenting it to the user. In an illustrative embodiment, the device is a pocket-sized FM radio and is equipped with a 1 megabyte semiconductor non-volative RAM memory. The memory includes a data structure that serves as a look-up table, matching code numbers to artist names and song titles. When the user queries the device to learn the identify of a song, the memory is indexed in accordance with one or more fields from the decoded watermark, and the resulting textual data from the memory (e.g. song title and artist) is annunciated or displayed to the user.

In most applications, such memory will require frequent updating. The RF receiver provides a ready mechanism for providing such updated data. In one embodiment, the radio "awakens" briefly at otherwise idle moments and tunes to a predetermined frequency at which updated data for the memory is broadcast, either in a baseband broadcast channel, or in an ancillary (e.g. SCA) channel. Or such data can be repeatedly transmitted on an SCA channel, received whenever the radio is turned on.

In variants of the foregoing, internet delivery of updated memory data can be substituted for wireless delivery. For example, the artist/song title memory in the personal player can be updated by placing the player in a "nest" every evening. The nest (which may be integrated with a battery charger for the appliance) can have an internet connection, and can exchange data with the personal device by infrared, inductive, or other proximity-coupling technologies, or through metal contacts. Each evening, the nest can receive an updated collection of artists/song titles, and can re-write the memory in the personal device accordingly. By such arrangement, the watermark data can always be properly interpreted for presentation to the user.

The "Capture" concepts noted above can be extended to other functions as well. One is akin to forwarding of email. If a consumer hears a song that another friend would enjoy, the listener can send a copy of the song to the friend. This instruction can be issued by pressing a "Send" button, or by invoking a similar function on a graphical (or voice- or gesture-responsive) user interface. In response, the appliance so-instructed can query the person as to the recipient. The person can designate the desired recipient(s) by typing in a name, or a portion thereof sufficient to uniquely identify the recipient. Or more typically, the person can speak the recipient's name. As is conventional with hands-free vehicle cell phones, a voice recognition unit can listen to the spoken instructions and identify the desired recipient. An "address book"-like feature has the requisite information for the recipient (e.g., the web site, IP address, or other data identifying the location to which music for that recipient should stored or queued, the format in which the music should be delivered, etc.) stored therein. In response to such command, the appliance dispatches instructions to the clearinghouse, including an authorization to debit the sender's credit card for the music charge. Again, the clearinghouse attends to delivery of the music in a desired manner to the specified recipient.

Still further, a listener may query the appliance (by voice, GUI or physical button, textual, gesture, or other input) to identify CDs on which the then-playing selection is recorded. Or the listener may query the appliance for the then-playing artist's concert schedule. Again, the appliance can contact a remote database, relay the query, and forward data from the watermark payload identifying the artist and/or song title to which the query relates. The database locates the requested data, and relays same back to the appliance for presentation (via a display, by machine speech, or other output) to the user. If desired, the user can continue the dialog with a further instruction, e.g., to buy one of the CDs on which the then-playing song is included. Again, this instruction may be entered by voice, GUI, etc., and dispatched from the appliance to the clearinghouse, which can then complete the transaction in accordance with pre-stored information (e.g. credit card account number, mailing address, etc.). A confirming message is relayed to the appliance for presentation to the user.

While the foregoing transactions require a link to a remote site or database, other watermark-based consumer services can be provided without such a link. For example, a user can query the appliance as to the artist or song-title of the selection currently playing. The appliance can consult the embedded watermark data (and optionally consult a memory to determine the textual names associated with coded watermark data), and provide the requested information to the user (e.g., by a display, annunciation, or other output).

The foregoing concepts (e.g. Capture, Send, etc.) can also be employed in connection with internet—rather than radio-delivery of music.

In other embodiments of the invention, the broadcast is not encoded with different data at different times (e.g., a different payload for each song). Instead, the broadcast is constantly encoded with a single identifier, e.g., identifying the broadcaster. The encoding can be the broadcaster's FCC call sign, a binary identifier corresponding to a particular station, etc. Such encoding can be effected anywhere in the audio chain, e.g., in the audio feed between the studio and the broadcast transmitter. The audio signal can be converted to digital form (if not already in such form), summed with a low level watermark signal, and converted back to analog form (if necessary).

In such arrangements, the user device (e.g., receiver 14) can include a real time clock. When a user hears or sees a broadcast of interest, and operates the "Capture" button (or other user interface feature), time data from the clock is written into a memory. The time data, and the decoded station identifier, can then (or later) be forwarded to a remote database to which the broadcaster writes its play log. By indexing the broadcaster's play log with the captured time data, the audio (or video) selection being broadcast at that instant can be identified. The content identifier thereby obtained can then be utilized as above-described to augment the user's enjoyment of the broadcast.

From the foregoing, it will be recognized that certain embodiments of the present invention allow internet and broadcast audio/video to be used to invoke the presentation of ancillary promotions, merchandizing, supplemental information, and entertainment—all keyed off watermark data.

To provide a comprehensive disclosure without unduly lengthening this specification, the above-detailed patents and applications are incorporated herein by reference.

Having described and illustrated the principles of the invention with reference to illustrative embodiments, it should be recognized that the invention is not so limited.

For example, while the detailed embodiment included a watermark decoder as part of the broadcast receiver, this is not essential. In other embodiments the receiver may include, for example, a memory (e.g., RAM) in which sampled excerpts of received audio can be stored under control of an associated CPU. The stored audio can thereafter be transferred to the computer 16, and the watermark decoded therefrom at the computer.

To save storage space in the receiver memory, the audio can be processed to reduce its size, without unduly impairing the watermark information conveyed thereby. One way this can be accomplished is to high pass filter the audio (e.g., with a cutoff frequency of one-fourth the sample frequency). Then the filtered audio can be quantized into a three state signal: −1, 0, or 1, depending on the polarity of the filtered signal. (Values within a predetermined threshold of 0 can be assigned a value of 0.) It will be recognized that such processing is a form of lossy compression—lossy because the process is not reversible. The watermark payload can be decoded from the resulting three-state signal (e.g., using the techniques disclosed in the cited patents and applications), even though the underlying audio carrier signal is essentially lost. This bit sequence can be further compressed using known lossless compression techniques (e.g., LZ77 or LZ78) to further save on storage requirements.

The just-described processing technique is illustrative only. The high pass filtering can be used without the quantization, and vice versa. Still other compression techniques can naturally be used, provided same do not unduly impair the encoded watermark information.

In one particular embodiment in which the receiver logs snippets of audio, all audio received by the receiver is digitized, and the last 5 seconds are always available in a FIFO RAM buffer. Upon activating the button 24 or other control, those 5 seconds of audio are copied into a separate retention memory, and the five next-following seconds of audio are likewise written into that retention memory, yielding 10 seconds of data from which the watermark can later be discerned. (The audio processing operation just described can be performed on-the-fly during such operation, or by post processing.) A number of such excerpts can be stored—one each time the button 24 is activated—depending on the capacity of the retention memory. Known user interface techniques can be employed to allow the user to manage this collection of data excerpts, e.g., controlling which are transmitted to the computer 16, which are invoked to obtain related internet content, which are permanently stored on-disk in the computer 16 to serve as long-term bookmarks to internet sites of particular interest, etc.

While receiver 14 and computer 16 are described as separate units, this need not be the case. The detailed functionality of these devices can be provided in a single unit.

Similarly, while the detailed embodiments employ particular watermarking techniques detailed in the cited patents and applications, the principles are equally applicable with any other digital watermarking technology, including those that transform the audio or video signal to another domain (e.g., wavelet, DCT, etc.), and alter the signal representation by changing the signal coefficients in such domain.

More generally, while the detailed embodiments have employed watermark technology, other arrangements can employ different auxiliary data-conveyal technologies, including SCA subcarriers, vertical blanking interval techniques, etc.

While the detailed embodiments focused on audio broadcast applications, the same principles can be employed with television, e.g., by encoding the picture information or the accompanying sound information. And, as noted, the techniques are likewise applicable to the internet-delivery of content, not involving over-the-air broadcast.

While the detailed embodiments contemplated that the broadcast content would correspond to a single internet destination, in other embodiments this may not be the case. In some embodiments, a song or other content may correspond to links to several alternative destinations. The user can be presented a menu of such links from which to choose. Or a link to one of several alternative destinations may be automatically chosen based on the context or environment in which the content was encountered. (E.g., if a user activates the "Capture" button on a portable radio receiver, a different link may be pursued than if the user actives the button while using a desktop computer. In such cases, context information sufficient to distinguish such settings would be relayed from the device to the remote system.)

In some of the above-described embodiments, the augmentation of the broadcast content is initiated by a user action, e.g., activating a Capture button. In others, the augmentation is automatic (e.g., presentation of streaming media corresponding to a watermark decoded from received audio). Still other arrangements are possible. For example, the augmented information can be automatically retrieved, but not presented to the user unless called for. The augmentation data can be cached, e.g., on the user's device, and presented immediately, on demand. In one such arrangement, a user listening to an internet radio broadcast can summon additional information by using dropdown menus of the sort typically associated with Windows applications. A "More" menu could present options such as "About the artist," "Order this music," "Concert schedules," etc. Unless requested, such information stays hidden. But when such menu is activated, the corresponding information is delivered from the cache.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A method comprising:
   receiving, from a personal device, query data at a remote computer system, wherein the query data comprises an identifier and data relating to a first user of the personal device, and wherein the identifier is extracted from audio content captured by the personal device;
   identifying, in response to receiving the query data, second audio content based upon the identifier;
   determining, using a processor, in response to receiving the query data, a predetermined location, wherein the predetermined location is different than the personal device; and queuing for download the second audio content to the predetermined location.

2. The method of claim 1, wherein the identifier identifies the audio content and wherein identification of the second audio content is based on the identity of the audio content.

3. The method of claim 1, further comprising receiving a timestamp, from the personal user device, wherein identifying the second audio content is based upon the identifier and the timestamp, and wherein the identifier identifies a broadcaster of the audio content.

4. The method of claim 1, wherein the identifier is embedded in the audio content as a watermark.

5. The method of claim 1, wherein a fingerprint extracted from the audio content is the identifier.

6. The method of claim 1, wherein the predetermined location is a web site.

7. The method of claim 1, wherein the predetermined location is based upon the first user of the personal device.

8. The method of claim 1, further comprising receiving identifying data associated with a second user different than the first user, wherein the predetermined location is base on the identifying data associated with the second user.

9. A system comprising:
one or more processors configured to:
receive, from a personal device, query data at a remote computer system, wherein the query data comprises an identifier and data relating to a first user of the personal device, and wherein the identifier is extracted from audio content captured by the personal device;
identify, in response to receiving the query data, second audio content based upon the identifier;
determine, in response to receiving the query data, a predetermined location, wherein the predetermined location is different than the personal device; and
queue for download the second audio content to the predetermined location.

10. The system of claim 9, wherein the identifier identifies the audio content and wherein identification of the second audio content is based on the identity of the audio content.

11. The system of claim 9, wherein the one or more processors are further configured to receive a timestamp, from the personal user device, wherein identifying the second audio content is based upon the identifier and the timestamp, and wherein the identifier identifies a broadcaster of the audio content.

12. The system of claim 9, wherein the identifier is embedded in the audio content as a watermark.

13. The system of claim 9, wherein a fingerprint extracted from the audio content is the identifier.

14. The system of claim 9, wherein the predetermined location is a web site.

15. The system of claim 9, wherein the one or more processors are further configured to receive identifying data associated with a second user different than the first user, wherein the predetermined location is base on the identifying data associated with the second user.

16. A non-transitory computer-readable medium having instructions stored thereon, the instructions comprising:
instructions for receiving, from a personal device, query data at a remote computer system, wherein the query data comprises an identifier and data relating to a first user of the personal device, and wherein the identifier is extracted from audio content captured by the personal device;
instructions for identifying, in response to receiving the query data, second audio content based upon the identifier;
instructions for determining, in response to receiving the query data, a predetermined location, wherein the predetermined location is different than the personal device; and
instructions for queuing for download the second audio content to the predetermined location.

17. The non-transitory computer-readable medium of claim 16, wherein the identifier identifies the audio content and wherein identification of the second audio content is based on the identity of the audio content.

18. The non-transitory computer-readable medium of claim 16, wherein the instructions further comprise instructions for receiving a timestamp, from the personal user device, wherein identifying the second audio content is based upon the identifier and the timestamp, and wherein the identifier identifies a broadcaster of the audio content.

19. The non-transitory computer-readable medium of claim 16, wherein the identifier is embedded in the audio content as a watermark.

20. The non-transitory computer-readable medium of claim 16, wherein a fingerprint extracted from the audio content is the identifier.

\* \* \* \* \*